United States Patent
Yeh et al.

(10) Patent No.: US 8,920,884 B2
(45) Date of Patent: Dec. 30, 2014

(54) METHOD FOR FABRICATING POLYMER STABILIZED ALIGNMENT LIQUID CRYSTAL DISPLAY PANEL

(75) Inventors: Shih-Wei Yeh, Yilan County (TW); Te-Sheng Chen, Hsinchu County (TW); Chih-Ho Chiu, Taipei (TW); Hsi-Chien Lin, Keelung (TW)

(73) Assignee: Au Optronics Corporation, Hsinchu (TW)

( * ) Notice: Subject to any disclaimer, the term of this patent is extended or adjusted under 35 U.S.C. 154(b) by 611 days.

(21) Appl. No.: 13/214,231

(22) Filed: Aug. 21, 2011

(65) Prior Publication Data

US 2012/0169980 A1 Jul. 5, 2012

(30) Foreign Application Priority Data

Dec. 31, 2010 (TW) .............................. 99147313 A

(51) Int. Cl.
| | |
|---|---|
| C09K 19/32 | (2006.01) |
| C09K 19/12 | (2006.01) |
| G02F 1/1337 | (2006.01) |
| C09K 19/04 | (2006.01) |
| C09K 19/54 | (2006.01) |

(52) U.S. Cl.
CPC .............. *C09K 19/322* (2013.01); *C09K 19/12* (2013.01); *G02F 1/133711* (2013.01); *C09K 2019/0448* (2013.01); *C09K 2019/548* (2013.01); *G02F 2001/133715* (2013.01)
USPC ............................ 427/492; 427/108; 427/508

(58) Field of Classification Search
CPC ...... C09K 19/12; C09K 19/32; C09K 19/322; C09K 2019/0448; C09K 2019/122; C09K 2019/123; C09K 2019/183; G02F 1/1337; G02F 1/133711; G02F 1/133788; G02F 2001/13775; G02F 2202/023
USPC .......................................... 427/108, 492, 508
See application file for complete search history.

(56) References Cited

U.S. PATENT DOCUMENTS

2010/0053527 A1* 3/2010 Hsieh et al. ................... 349/124

FOREIGN PATENT DOCUMENTS

| JP | 2008-076950 | 4/2008 |
|---|---|---|
| JP | 2009-092816 | 4/2009 |
| TW | 200628859 | 8/2006 |
| TW | 200804271 | 1/2008 |
| TW | 200949385 | 12/2009 |

\* cited by examiner

*Primary Examiner* — Elena T Lightfoot
(74) *Attorney, Agent, or Firm* — Jianq Chyun IP Office

(57) ABSTRACT

A method for fabricating a polymer stabilized alignment liquid crystal display panel including: filling a liquid crystal layer between a first substrate and a second substrate, the liquid crystal layer including liquid crystal molecules, monomer with single functional group and monomer with multiple functional groups; polymerizing the monomer with single functional groups to form two alignment layers over inner surfaces of the first substrate and the second substrate; and polymerizing the monomer with multiple functional groups to form a polymer capable of pre-tilting the liquid crystal molecules.

10 Claims, 3 Drawing Sheets

METHOD FOR FABRICATING POLYMER STABILIZED ALIGNMENT LIQUID CRYSTAL DISPLAY PANEL

CROSS-REFERENCE TO RELATED APPLICATION

This application claims the priority benefit of Taiwan application serial no. 99147313, filed on Dec. 31, 2010. The entirety of the above-mentioned patent application is hereby incorporated by reference herein and made a part of specification.

BACKGROUND OF THE INVENTION

1. Field of the Invention

The present invention relates to a method for fabricating a liquid crystal display panel, more particularly, to a method for fabricating a polymer stabilized alignment liquid crystal display (PSA-LCD) panel.

2. Description of Related Art

With the continuous advancement of the liquid crystal display (LCD) device towards to the large-size display standard, the market is gravitating towards LCDs having characteristics such as high contrast ratio, rapid response, and wide viewing angle. Therefore, the wide viewing angle techniques of the liquid crystal display panel are continuously developed in order to overcome the viewing angle problem of the large-size display device. Currently, multi-domain vertical alignment (MVA) LCD panels and polymer stabilized alignment (PSA) LCD panels are conventional wide viewing-angle technologies.

Take the method for fabricating the PSA-LCD panels as an example, the fabricating method thereof is complicated. FIG. 3 schematically illustrates a flow chart of the method for fabricating a conventional PSA-LCD panel. Referring to FIG. 3, the method for fabricating the conventional PSA-LCD panel includes formation of polyimide (PI) alignment films, sealant dispensing, liquid crystal dispensing, vacuum assembly of substrates, sealant curing, UV exposure, cells cutting, cells grinding, polarizer attaching, and so on. It is noted that, during fabrication of the PSA-LCD panels, the liquid crystal layer having monomer doped therein is used, a predetermined bias is applied to the liquid crystal layer, and the liquid crystal layer is irradiated by UV light. At this time, the monomer doped in the liquid crystal layer polymerizes to form polymer layers at two opposite sides of the liquid crystal layer such that the liquid crystal molecules are aligned by the polymer layers. Since the fabrication of PI alignment films includes pre-cleaning, PI coating, pre-baking and post-baking, the complexity of the PSA-LCD panels is increased due to the fabrication of PI alignment films.

Currently, some PI-less technologies have been proposed by prior arts so as to reduce the complexity of the PSA-LCD panels. Specifically, the above-mentioned PI-less technologies are usually applied to liquid crystal cells having alignment protrusions. The alignment protrusions make the liquid crystal molecules pre-tilt. However, the PI-less technologies only vertically aligned the liquid crystal molecules. Since only parts of the liquid crystal molecules distributed around the alignment protrusions are pre-tilted, response of the liquid crystal layer is slow. In addition, light leakage often occurs at the regions corresponding to the alignment protrusions, and the contrast ratio of the PSA-LCD panels decrease accordingly.

How to improve the contrast ratio and enhance response without increasing complexity of fabricating process of the PSA-LCD panels is an important issue to be solved.

SUMMARY OF THE INVENTION

The invention provides a method for fabricating a PSA-LCD panel.

The invention provides a fabricating method for a PSA-LCD panel. The fabricating method for the PSA-LCD panel includes: filling a liquid crystal layer between a first substrate and a second substrate, the liquid crystal layer including liquid crystal molecules, monomer with single functional group and monomer with multiple functional groups; polymerizing the monomer with single functional group to form two alignment films on inner surfaces of the first substrate and the second substrate; and polymerizing the monomer with multiple functional groups to form polymers on inner surfaces of the alignment films to pre-tilt the liquid crystal molecules.

In an embodiment of the present invention, the materials of the monomer with single functional group are described as followings:

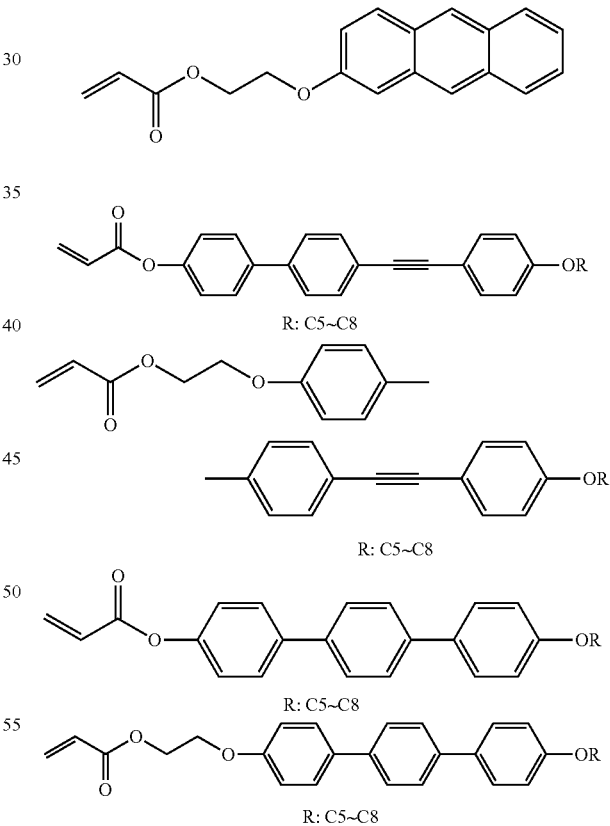

In an embodiment of the present invention, the concentration of the monomer with single functional group ranges from about 0.5% to about 10%.

In an embodiment of the present invention, the materials of the monomer with multiple functional groups are described as followings:

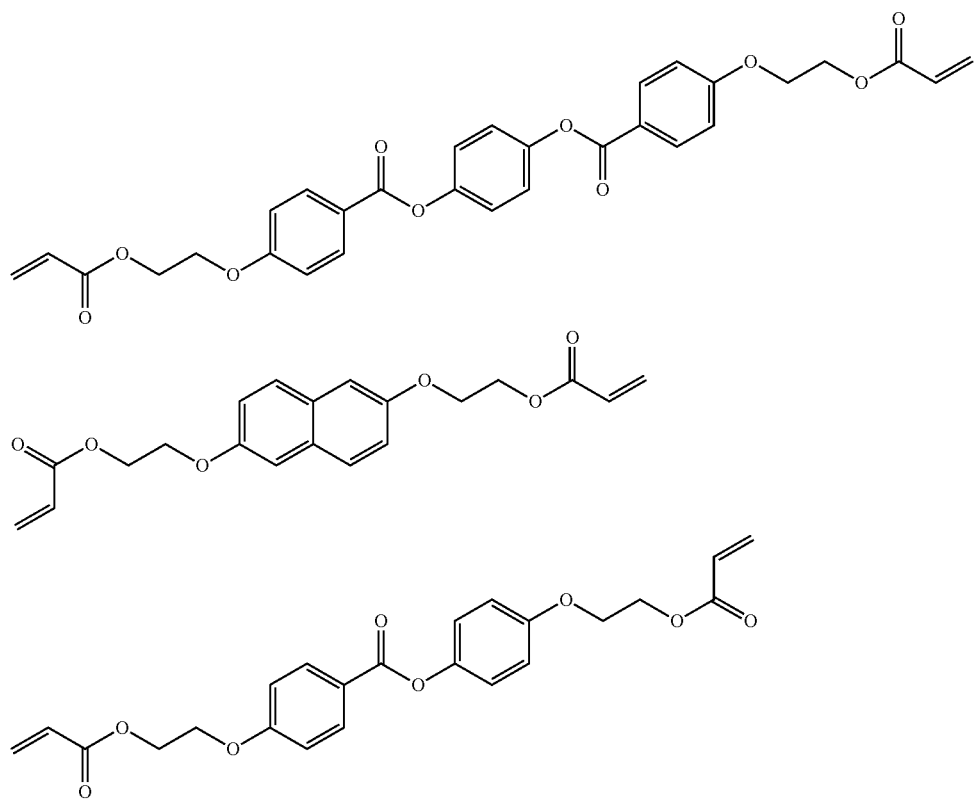

In an embodiment of the present invention, the concentration of the monomer with multiple functional groups ranges from about 0.1% to about 0.5%.

In an embodiment of the present invention, the method for polymerizing the monomer with single functional group to form the alignment films includes irradiating a first UV light on the monomer with single functional group.

In an embodiment of the present invention, the method for polymerizing the monomer with multiple functional groups to form the polymers includes: applying a bias to the liquid crystal layer; and irradiating a second UV light on the monomer with multiple functional groups. The wavelength range of the second UV light is different from the wavelength range of the first UV light.

In an embodiment of the present invention, a first polymer is formed on a surface of each of the alignment films by polymerization of the monomer with single functional group. The liquid crystal layer is vertically aligned by the first polymer.

In an embodiment of the present invention, a polymer polymerized by the monomer with multiple functional groups is a second polymer. The liquid crystal layer is pre-tilted by the second polymer.

Since the monomer with single functional group and the monomer with multiple functional groups are doped in the liquid crystal layer, and the monomer with single functional group and the monomer with multiple functional groups are irradiated by UV lights having different wavelength ranges, the liquid crystal layer is vertically aligned and pre-tilted by the polymers formed by the monomer with single functional group and the monomer with multiple functional groups.

To make the above and other objectives, features, and advantages of the present invention more comprehensible, several embodiments accompanied with figures are detailed as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
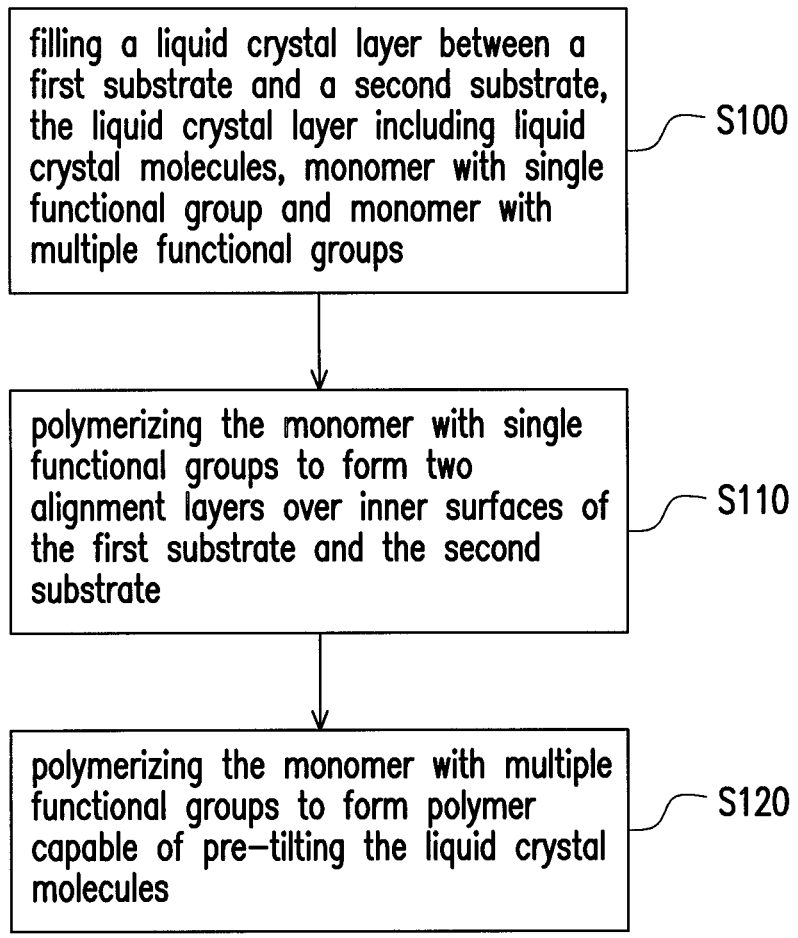
FIG. 1 schematically illustrates flow chart of a method for fabricating the PSA-LCD panel according to an embodiment of the present invention.
Figure 2A:
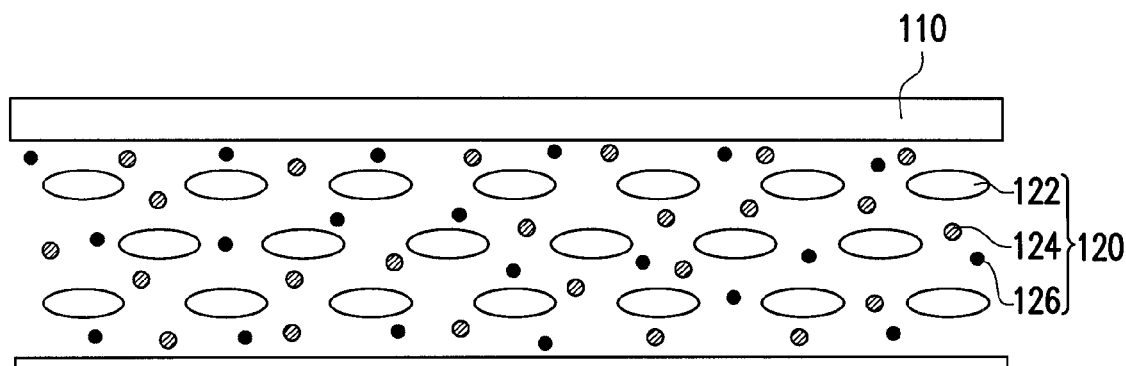
FIG. 2A through FIG. 2C schematically illustrate cross-sectional views of the method for fabricating the PSA-LCD panel according to an embodiment of the present invention.
Figure 2B:
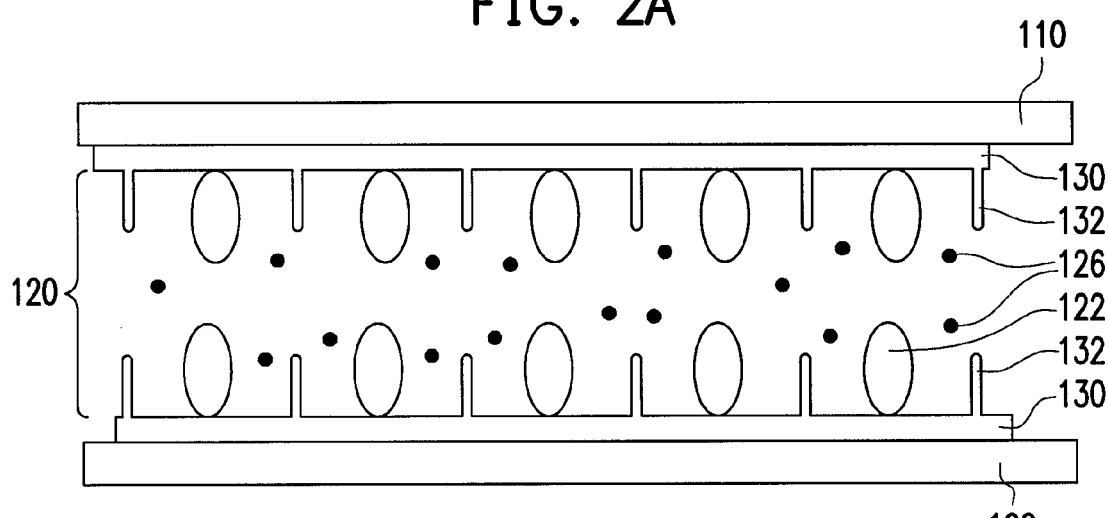
Figure 2C:
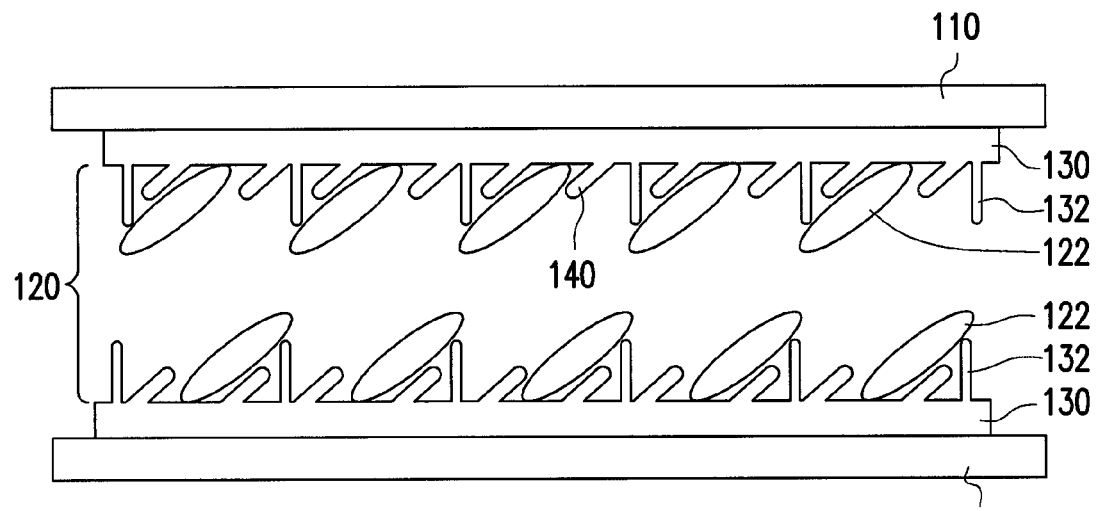
Figure 3:
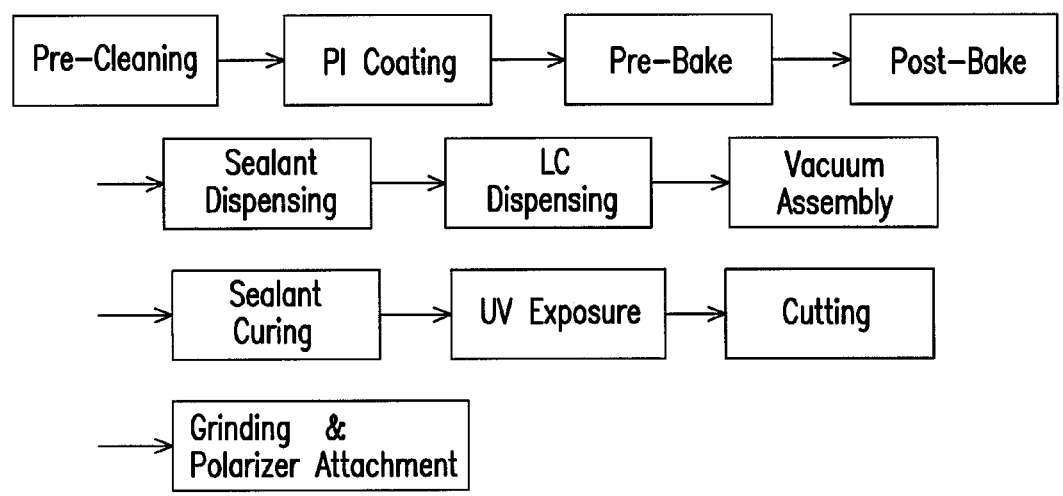
FIG. 3 schematically illustrates a flow chart of the method for fabricating a conventional PSA-LCD panel.

FIG. 1 schematically illustrates flow chart of a method for fabricating the PSA-LCD panel according to an embodiment of the present invention. FIG. 2A through FIG. 2C schematically illustrate cross-sectional views of the method for fabricating the PSA-LCD panel according to an embodiment of the present invention. Referring to FIG. 1, the method for fabricating the PSA-LCD panel of the present embodiment includes the following steps (S100~S120). The steps (S100~S120) are described in detail as followings.

Referring to FIG. 1 and FIG. 2A, a liquid crystal layer 120 is filled between a first substrate 100 and a second substrate 110 first, wherein the liquid crystal layer 120 includes liquid crystal molecules 122, monomer with single functional group 124 and monomer with multiple functional groups 126 (step S100). The first substrate 100 is an active device array substrate and the second substrate 110 is a color filter substrate, for example. In another embodiment of the present application, the first substrate 100 may be a color filter on array (COA) substrate or an array on color filter (AOC) substrate, while the second substrate 110 may be an opposite substrate having no color filter formed thereon. The types of the first substrate 100 and the second substrate 110 are not limited in the invention.

In the present embodiment, the liquid crystal layer 120 is filled between the first substrate 100 and the second substrate 110 by vacuum injection. However, the liquid crystal layer 120 may also be filled between the first substrate 100 and the second substrate 110 by one drop filling (ODF) process or other processes. It is noted that the liquid crystal molecules 122 of the liquid crystal layer 120 is vertically aligned type liquid crystal molecules. For example, the materials of the liquid crystal molecules 122 are described as followings:

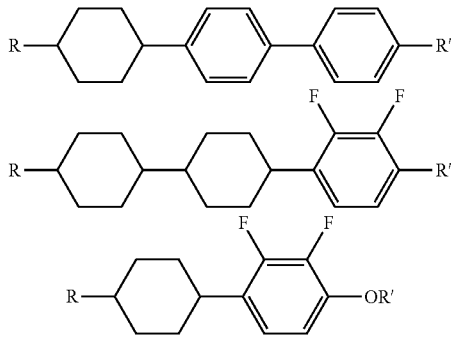

The above-mentioned liquid crystal layer 120 can be obtained from MLC-6608 sold by Merck Company.

In the present embodiment, the materials of the monomer with single functional group 124 are described as followings:

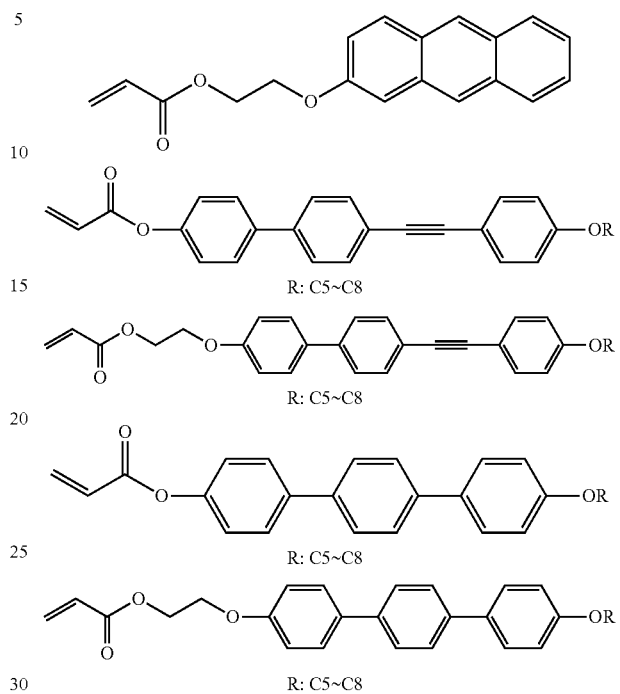

The concentration of the monomer with single functional group 124 ranges from about 0.5% to about 10%, for example.

In the present embodiment, the materials of the monomer with multiple functional groups 126 are described as followings:

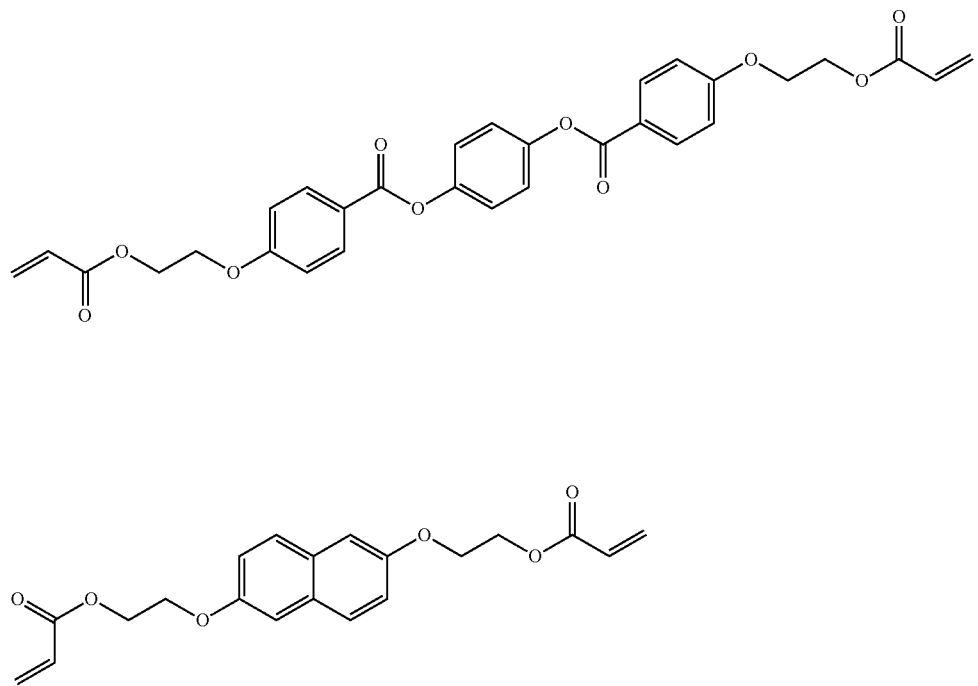

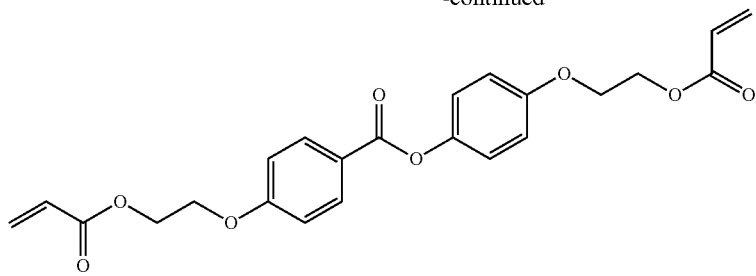

The concentration of the monomer with multiple functional groups 126 ranges from about 0.1% to about 0.5%, for example.

Referring to FIG. 1 and FIG. 2B, after the liquid crystal layer 120 is filled between the first substrate 100 and the second substrate 110, the monomer with single functional group 124 is polymerized to respectively form two alignment films 130 on the inner surfaces of the first substrate 100 and the second substrate 110 (step S110). In the step S110, a first UV light is utilized to irradiate on the liquid crystal layer 120. The monomer with single functional group 124 doped in the liquid crystal layer 120 absorbs the first UV light and is polymerized to form the alignment films 130 when no bias is applied thereto.

In order to ensure that the monomer with single functional group 124 can polymerize successfully after being irradiated by the first UV light, proper amount of initiator can be optionally added into the liquid crystal layer 120.

As shown in FIG. 2B, after the monomer with single functional group 124 is polymerized, not only the alignment films 130 are formed, but also a first polymer 132 is formed simultaneously on the inner surface of the alignment films 130. In addition, the first polymer 132 is formed by polymerization of the monomer with single functional group 124 also. The liquid crystal molecules 122 of the liquid crystal layer 120 are vertically aligned by the first polymer 132.

In the present embodiment, the wavelength range of the first UV light ranges from about 330 nm to about 400 nm. In addition, the monomer with multiple functional groups 126 does not react or polymerize when being irradiated by the first UV light. In other words, after the liquid crystal layer 120 is irradiated by the first UV light, the monomer with multiple functional groups 126 still exists between the liquid crystal molecules 122.

Referring to FIG. 1 and FIG. 2C, after the alignment films 130 are formed, the monomer with multiple functional groups 126 is polymerized to form polymers 140 on the inner surfaces of the alignment films 130 (step S120). The liquid crystal molecules 122 are pre-tilted by the polymers 140. In the step S120, the second UV light is utilized to irradiate on the liquid crystal layer 120, in addition, different voltages are applied to the first substrate 100 and the second substrate 110 respectively such that a bias (e.g. 15 volts) is applied to the liquid crystal layer 120. The monomer with multiple functional groups 126 doped in the liquid crystal layer 120 absorbs the second UV light and is polymerized to form the second polymer 140 on the alignment films 130.

In order to ensure that the monomer with multiple functional groups 126 can polymerize successfully after being irradiated by the second UV light, proper amount of initiator can be optionally added into the liquid crystal layer 120.

In the present embodiment, the wavelength range of the second UV light ranges from about 290 nm to about 400 nm. In addition, the wavelength range of the second UV light is different from the wavelength range of the first UV light. Since each of the monomer with single functional group 124 and the monomer with multiple functional groups 126 may selectively absorb UV lights having different wavelength ranges, the monomer with single functional group 124 and the monomer with multiple functional groups 126 do not react or polymerize at the same time when being irradiated by the first UV light or the second UV light. Accordingly, the polymerization process is easy to control.

Since the monomer with single functional group and the monomer with multiple functional groups are doped in the liquid crystal layer, and the monomer with single functional group and the monomer with multiple functional groups are irradiated by UV lights having different wavelength ranges, the polymers (including the alignment films, the liquid crystal layer is vertically aligned and pre-tilted by the first polymer and the second polymer) formed by the monomer with single functional group and the monomer with multiple functional groups.

Although the present invention has been disclosed by the above embodiments, they are not intended to limit the present invention. Those skilled in the art may make some modifications and alterations without departing from the spirit and scope of the present invention. Therefore, the protection range of the present invention falls in the appended claims.

What is claimed is:

1. A fabricating method for a polymer stabilized alignment liquid crystal display (PSA-LCD) panel, comprising:
    filling a liquid crystal layer between a first substrate and a second substrate, the liquid crystal layer including liquid crystal molecules, monomer with single functional group and monomer with multiple functional groups;
    irradiating a first UV light with no bias applied to the liquid crystal layer to polymerize the monomer with single functional group to form two alignment films and at least one first polymer on inner surfaces of the first substrate and the second substrate, wherein the first polymer is formed on inner surfaces of the alignment films, and wherein the first polymer consists of units of the monomer with single functional group;
    applying a bias to the liquid crystal layer; and
    irradiating a second UV light to polymerize the monomer with multiple functional groups to form at least one second polymer on inner surfaces of the alignment films disposed on the first substrate and the second substrate, wherein the liquid crystal molecules are pre-tilted by the second polymer, and the second polymer consists of units of the monomer with multiple functional groups.

2. The fabricating method for a polymer stabilized alignment liquid crystal display (PSA-LCD) panel of claim 1, wherein in a step of polymerizing the monomer with single functional group to form two alignment films and at least one first polymer, materials of the monomer with single functional group are described as follows:

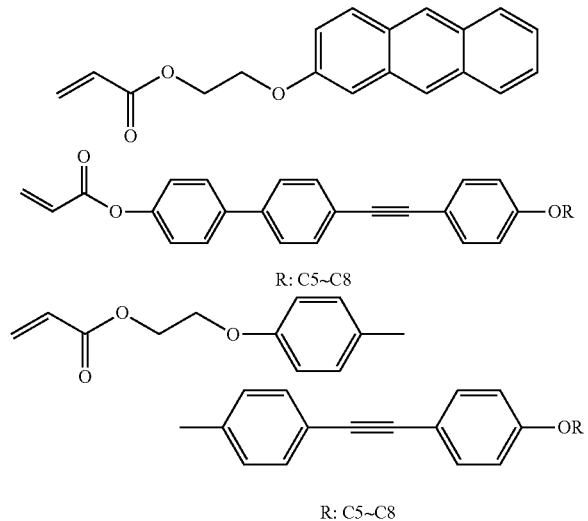

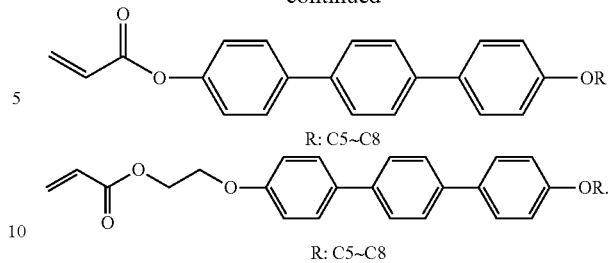

3. The fabricating method for a polymer stabilized alignment liquid crystal display (PSA-LCD) panel of claim 1, wherein in a step of polymerizing the monomer with single functional group to form two alignment films and at least one first polymer, a concentration of the monomer with single functional group ranges from 0.5% to 10%.

4. The fabricating method for a polymer stabilized alignment liquid crystal display (PSA-LCD) panel of claim 1, wherein in a step of polymerizing the monomer with multiple functional groups to form at least one second polymer on inner surfaces of the alignment films, materials of the monomer with multiple functional groups are described as follows:

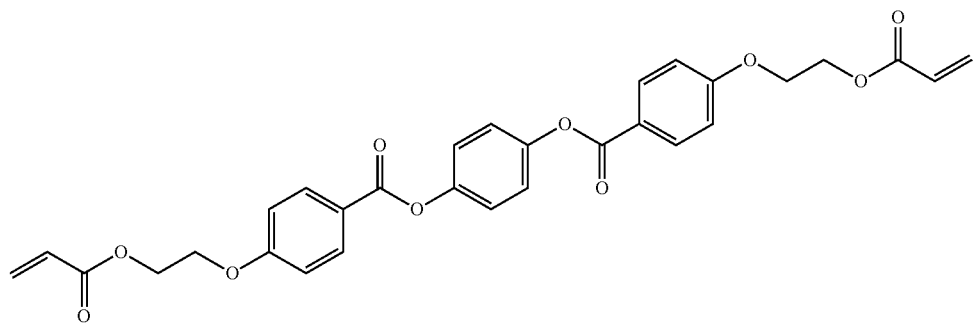

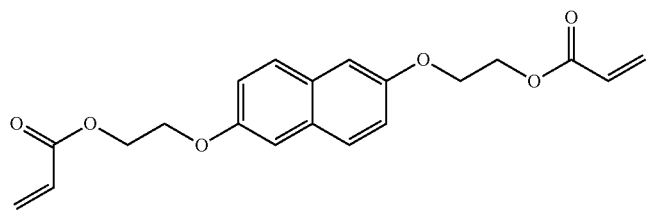

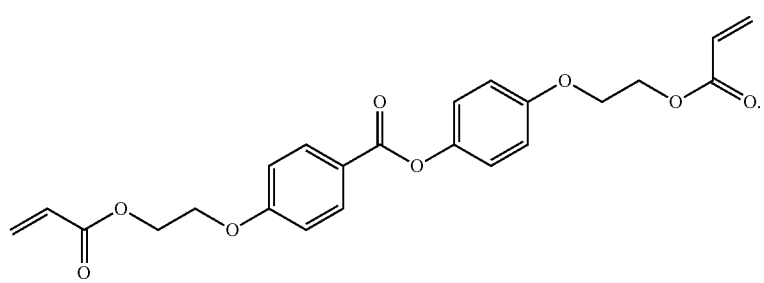

5. The fabricating method for a polymer stabilized alignment liquid crystal display (PSA-LCD) panel of claim 1, wherein in a step of polymerizing the monomer with multiple functional groups to form at least one second polymer on inner surfaces of the alignment films, a concentration of the monomer with multiple functional groups ranges from 0.1% to 0.5%.

6. The fabricating method for a polymer stabilized alignment liquid crystal display (PSA-LCD) panel of claim 1, wherein
the wavelength range of the second UV light is different from the wavelength range of the first UV light.

7. The fabricating method for a polymer stabilized alignment liquid crystal display (PSA-LCD) panel of claim 1, wherein in a step of polymerizing the monomer with singly functional group to form two alignment films and at least one first polymer, the liquid crystal layer is vertically aligned by the first polymer.

8. The fabricating method for a polymer stabilized alignment liquid crystal display (PSA-LCD) panel of claim 1, wherein the first polymer and the second polymer are formed on an inner surface of each of the alignment films in a discontinous pattern.

9. The fabricating method for a polymer stabilized alignment liquid crystal display (PSA-LCD) panel of claim 1, wherein during the irradiation of the first UV light, only the monomer with single functional group undergoes a polymerization, and wherein the monomer with multiple functional groups does not undergoe a polymerization.

10. The fabricating method for a polymer stabilized alignment liquid crystal display (PSA-LCD) panel of claim 1, wherein during the irradiation of the second UV light, only the monomer with multiple functional groups undergoes a polymerization, and wherein the monomer with single functional group does not undergoe a polymerization.

* * * * *